US005850244A

United States Patent [19]

Leonard et al.

[11] Patent Number: 5,850,244

[45] Date of Patent: Dec. 15, 1998

[54] DEP (DIRECT ELECTROSTATIC PRINTING) DEVICE WITH SPECIAL PRINTHEAD

[75] Inventors: Jacques Leonard, Antwerpen; François Backeljauw, Zwijndrecht; Guido Desie, Herent; André Van Geyte, Schilde, all of Belgium

[73] Assignee: Agfa-Gevaert, Mortsel, Belgium

[21] Appl. No.: 554,660

[22] Filed: Nov. 8, 1995

[30] Foreign Application Priority Data

Nov. 8, 1994 [EP] European Pat. Off. .............. 94203255

[51] Int. Cl.[6] .............................. B41J 2/47; G01D 15/14; G02B 26/00; G02B 27/00

[52] U.S. Cl. .............................................. 347/141; 347/55

[58] Field of Search ..................................... 347/120, 123, 347/111, 141, 159, 103, 154, 55, 128, 127, 17

[56] References Cited

U.S. PATENT DOCUMENTS

| | | | |
|---|---|---|---|
| 4,478,510 | 10/1984 | Fujii et al. | 347/55 |
| 5,095,322 | 3/1992 | Fletcher | 347/55 |
| 5,121,144 | 6/1992 | Schmidlin et al. | 347/55 |
| 5,202,704 | 4/1993 | Larson et al. | 347/55 |
| 5,204,696 | 4/1993 | Iwao | 347/55 |
| 5,363,124 | 11/1994 | Arway | 347/74 |
| 5,609,910 | 3/1997 | Hackleman | 347/58 |

FOREIGN PATENT DOCUMENTS

| | | |
|---|---|---|
| 0587366 | 3/1994 | European Pat. Off. . |

*Primary Examiner*—Benjamin R. Fuller
*Assistant Examiner*—Raquel Yvette Gordon
*Attorney, Agent, or Firm*—Baker & Botts, L.LP.

[57] ABSTRACT

A device for direct electrostatic printing (DEP) including a back electrode, a printhead structure made from an insulating material and having a control electrode in combination with printing apertures, and a toner delivery apparatus that presents a cloud of toner particles in the vicinity of the printing apertures, in which the printhead structure is tightly stretched over a frame by means of lateral forces and the printhead structure has an overall flatness equal to or better than 50 $\mu$m.

17 Claims, 4 Drawing Sheets

DEP (DIRECT ELECTROSTATIC PRINTING) DEVICE WITH SPECIAL PRINTHEAD

DESCRIPTION

1. Field of the Invention

This invention relates to the process of Direct Electrostatic Printing (DEP). In DEP electrostatic printing is performed directly on a substrate by means of electronically addressable printheads and the toner has to fly in an imagewise manner towards the receiving substrate. More particularly the present invention relates to the printhead structure.

2. Background of the Invention.

In DEP (Direct Electrostatic Printing) the toner or developing material is deposited directly in an imagewise way on a substrate, the latter not bearing any imagewise latent electrostatic image. The substrate can be an intermediate, in case it is preferred to transfer said formed image on another substrate (e.g. aluminum, etc.), but it is preferentially the final receptor, thus offering a possibility to create directly the image on the final receptor, e.g. plain paper, transparency, etc. . . . after a final fusing step. This makes the method different from classical electrography, in which a latent electrostatic image on a charge retentive surface is developed by a suitable material to make the latent image visible and in which either the powder image is fused directly to said charge rentententive surface, which then results in a direct electrographic print, or in which the powder image is subsequently transferred to the final substrate and then fused to that medium, the latter proces resulting in an indirect electrographic print. The final substrate can be different materials, such as a transparent medium, opaque polymeric films, paper, etc. . . . .

DEP is also markedly different from electrophotography in which an additional step and additional member is introduced to create the latent electrostatic image, more specifically, a photoconductor is used and a charging/exposure cycle is necessary.

A DEP device is disclosed in U.S. Pat. No. 3,689,935. This document discloses an electrostatic line printer comprising a multilayered particle modulator or printhead comprising a layer of insulating material, a continuous layer of conductive material on one side of the layer of the insulating material and a segmented layer of conductive material on the other side of the layer of the insulating material. The printhead comprises also at least one row of printing apertures. Each segment of the segmented layer of conductive material is formed around a portion of an aperture and is insulatively isolated from each other segment of the segmented conductive layer. Selected potentials are applied to each of the segments of the segmented conductive layer while a fixed potential is applied to the continuous conductive layer. An overall applied propulsion field projects charged particles through a row of printing apertures of the particle modulator (printhead) and the intensity of the particle stream is modulated according to the pattern of potentials applied to the segments of the segmented conductive layer. The modulated stream of charged particles impinges upon a print-receiving medium interposed in the modulated particle stream and translated in a direction relative to the particle modulator (printhead) to provide a line-by-line scan printing. The segmented electrode is called the control electrode and the continuous electrode is called the shield electrode. The shield electrode faces, e.g.,the toner supply and the control electrode faces the image recording member. A DC field is applied between the printhead and a backing electrode and this propulsion field is responsible for the attraction of toner to the imaging receiving member that is placed between the printhead and the backing electrode.

In DEP printing it is important to offer toning particles in a uniform way to the printhead. Several means have been dislosed to offer toning particles in a uniform way to the printhead, e.g. specially designed toner belts, vibration of toner belts, etc. The toning particles are selected from the toner offering means through the printing apertures to reach receiving members at a fixed distance.

In GB 2,108,432 means are disclosed for realising a stable and uniform supply of toner particles to the printhead. Therefore a conveying member is provided on which a layer of toner particles is deposited and an AC voltage is applied between the toner conveying member and the continuous layer of conductive material on the printhead structure. Due to this AC voltage the toner particles "jump" between the toner conveying member and the surface of the printhead facing said toner conveying member, forming a "toner-cloud".

In U.S. Pat. No. 4,568,955 an apparatus is disclosed wherein the toning particles are presented to the printhead structure in layer form on a conveying member. Said conveying member has a special design and AC/DC fields are used to realise jumping transport along said printhead structure.

In EP-A 266 961 a toner delivery system is disclosed in which a monolayer of toner is deposited on the surface of the toner conveying means using a multi-component developer (carrier/toner) and a conventional magnetic brush.

In European application 94201026.5 filed on Apr. 14, 1994 and in U.S. Pat. No. 5,327,169 it is disclosed that it is advantageous to eliminate toner conveying means between a conventional magnetic brush and the printhead structure and to extract a "toner cloud" directly from the magnetic brush.

All these modifications to the DEP principle make it possible to uniformily and easily extract toner particles out of the toner cloud, but the final image quality does not only depend on the uniformity of the toner cloud that is presented to the printhead structure, but also strongly depends on the flatness of the printhead structure itself and the resultant distance between the printhead structure and the toner cloud. The printhead structure has to be as thin as possible to avoid clogging of the printing apertures in the printhead. The machining of said thin printhead structure to the desired degree of flatness or mounting it with the desired degree of flatness within the DEP device is quite complicated.

It is thus still needed to have simple but effective means for installing a thin printhead in a DEP device as flat as possible.

OBJECTS AND SUMMARY OF THE INVENTION

It is an object of the invention to provide a DEP device wherein the printhead has the needed flatness.

It is another object of the invention to provide means for keeping the printhead flat even with variations in ambient temperature and aging of the materials.

Futher objects and advantages of the present invention will become clear from the detailed description hereinafter.

The objects of the invention are realised by providing a device for direct electrostatic printing (DEP) on an intermediate substrate or on a final substrate, comprising a back electrode (105), a printhead structure (106) made from an insulating material comprising a control electrode in combination with printing apertures (107), a toner delivery means (101) presenting a cloud (104) of toner particles in the vicinity of said printing apertures (107), characterised in that said printhead structure (106) is tightly stretched over a frame by means of lateral forces applied to said printhead structure and said printhead structure (106) has an overall flatness equal to or better than 50 μm.

In a further preferred embodiment both said printhead structure and said frame are rectangular or square and said lateral forces are exerted on every side of said printhead structure.

In a more preferred embodiment said lateral forces are exerted on said printhead structure via resilient elements.

DETAILED DESCRIPTION OF THE INVENTION

Figure 1:
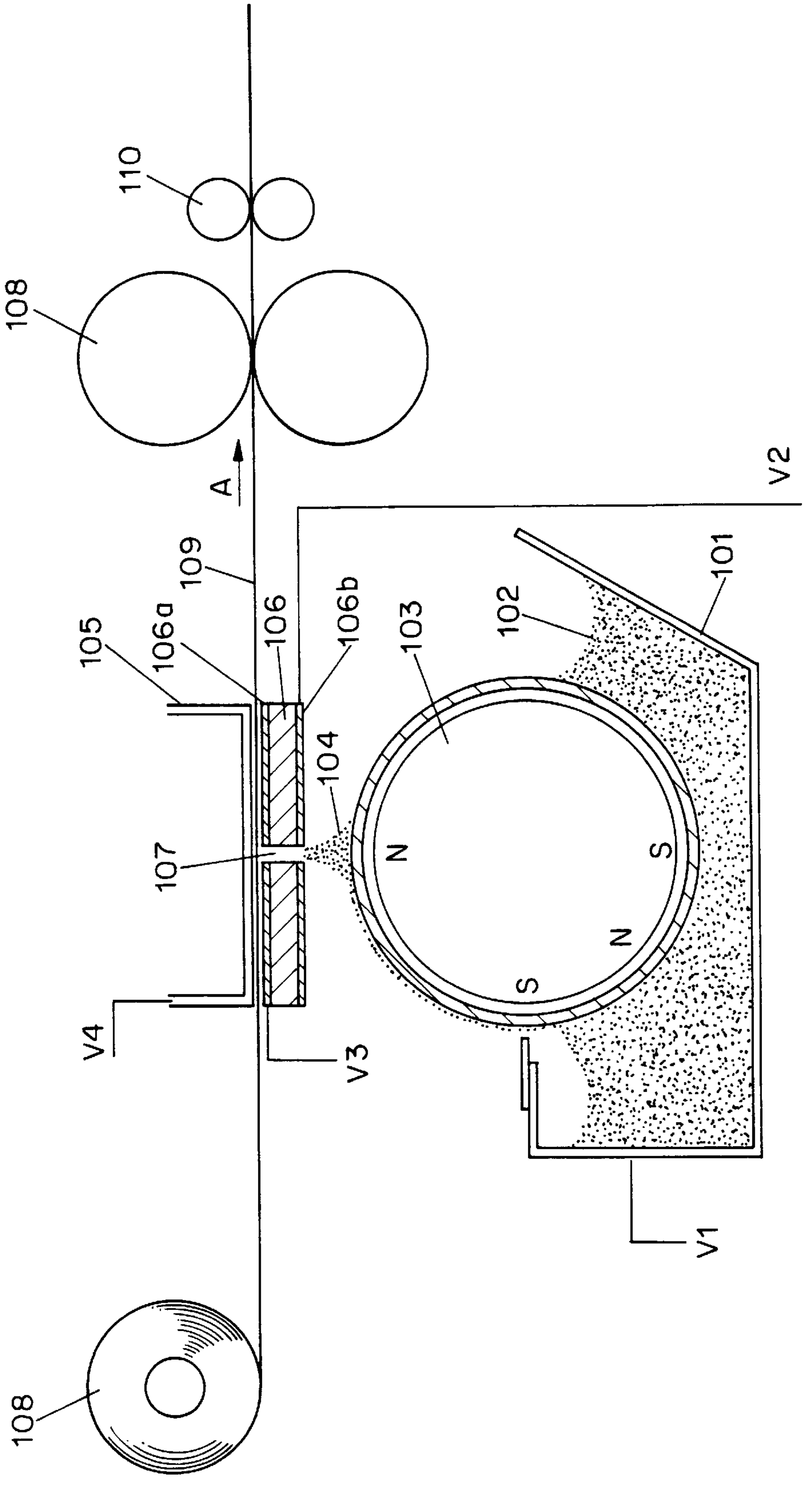
FIG. 1 is a schematic illustration of a possible embodiment of a DEP device.

A possible embodiment of device for implementing DEP (Direct Electrostatic Printing) comprises (FIG. 1):

(i) a toner delivery means (101), comprising a container for developer (102) and a magnetic brush assembly (103), this magnetic brush assembly forming a toner cloud (104)

(ii) a back electrode (105)

(iii) a printhead structure (106), made from a plastic insulating film, coated on both sides with a metallic film. The printhead structure (106) comprises one continuous electrode surface, hereinafter called "shield electrode" (106*b*) facing in the shown embodiment the toner delivering means and a complex addressable electrode structure, hereinafter called "control electrode" (106*a*) around printing apertures (107), facing, in the shown embodiment, the toner-receiving member in said DEP device. The location of the shield electrode (106*b*) and the control electrode (106*a*) can, in other embodiments of a device for DEP method be different from the location shown in FIG. 1.

(iv) conveyer means (108) to convey an image receptive member (109) for said toner between said printhead structure and said back electrode in the direction indicated by arrow A.

(v) means for fixing (110) said toner onto said image receptive member.

In DEP (Direct Electrostatic Printing) clogging of the printing apertures in the printhead structure by the toner particles is frequently encountered. Therefore, besides other solutions, it has been disclosed in U.S. Pat. No. 5,170,185 that it is important that the diameter of the printing apertures in the printhead structure and the axial length of the aperture are matched and that the axial length of the aperture is at most 5 times larger than the diameter of it, preferably the axial length is equal to the diameter of the printing apertures.

When designing a high resolution DEP device (i.e. a device comprising a printhead structure wherein the printing apertures have a small diameter) it is necessary to have very thin printhead structures. Since the diameter of the printing apertures is at most 100 μm, the printhead can at most be 500 μm thick, and preferably only 100 μm.

This thin printhead structure has to be mounted as close as possible to the toner receiving subtrate since this limits the spreading of the toner particles before they reach the receiving substrate. The distance between printhead and receiving substrate is normally between 5 and 1000 μm, preferably between 25 and 500 μm.

It is clear that every aperture on the printhead has to be the same distance from the receiving substrate since otherwise the printing resolution will not be equal for each printhead. This means that a very thin (100 μm≦thickness≦500 μm) printhead has to be mounted as flat as possible.

It was found that a printhead structure made from an insulating material and comprising a control electrode, wherein said insulating material is preferably a plastic material and said control electrode is preferably made of metal, can be mounted very flat when said printhead structure (106) is tightly stretched over a frame by means of lateral forces applied to said printhead.

The printhead structure is preferably stretched so that the overall flatness of said printhead structure when stretched over said frame becomes equal to or better than 50 μm. Preferably the overall flatness of the printhead structure is better than 25 μm.

The overall flatness of the printhead structure is defined as the top to top topological value, measured by scanning the printhead structure over the total witdth with an optical (contactless) profilometer at a spatial resolution of 125 point/mm and a height resolution better than 1 μm.

Said frame can have any form, it can be circular, elliptic, polygonal, triangular, square, rectangular, etc. In its simplest form, the frame can be only one bar, over which the printhead structure is stretched.

In another embodiment said frame consists of 2 parallel bars over which the printhead structure is stretched. Preferably said frame is either square or rectangular. However, said square or rectangular frame does not have to be a closed rectangle or square. Said frame can comprise only four straight bars, positioned along the sides of a rectangle or square, in such a way that the elongation of each of said bars in both directions would yield a rectangle or a square.

The bars (both single bar, the bars that are arranged as a pair of parallel bars and the bars arranged along the four sides of a square or rectangle) have to fit in a two dimensional plane within a tolerance of 50 μm, preferably 25 μm. The overall flatness of at least one bar of the frame, but preferably of each individual bar, contacting the printhead structure is preferably better than 50 μm, more preferably better than 25 μm. This flatness, defined as the top to top topological value, is measured by scanning the surface of the bar over the total length with an optical (contactless) profilometer at a spatial resolution of 125 point/mm and a height resolution better than 1 μm.

The bars, used in the device according to the present invention, can be made of any material suitable to be machined to a flatness better than 50 μm, preferably better than 25 μm. Very suitable materials are, e.g., copper, stainless steel, etc.

The shape of said bars can vary widely. It can be simple cylinders, hollow cylinders, profiles of any shape, e.g. T-profiles, U-profiles, open rectangular profiles, etc.

The bars, used in the frame to be used in a device according to the present invention, can be built into a larger framework. This larger framework can be made of any material that can be machined to keep the tolerances applied to the frame formed by the bars. The larger framework can also be injection moulded. In this case it is possible to injection mould a framework wherein the bars forming the frame can separately be mounted or with the bars forming the frame already included in the larger framework. Suitable materials to build the larger framework are, e.g., PVC (polyvinylchloride), (fiber reinforced) epoxy resins, bakelite, aluminium, etc.

The printhead structure comprises an insulating material, which is preferably a plastic material. The plastic material can be any polyester, (fiber reinforced) epoxy resins, polyimide resins, etc. The use of polyimide resins as insulating material is the most preferred for producing printhead structures according to the present invention.

The printhead structure comprises also metal layers applied to said plastic insulating material. These metal layers are preferably between 1 and 50 $\mu$m thick, more preferably between 3 and 20 $\mu$m. The metal layer can eventually be a multi-layer of different metals or of the same metal. The insulating material is preferably between 20 and 200 $\mu$m thick, most preferably between 25 and 100 $\mu$m.

The printhead structure is stretched over said frame by lateral forces. By lateral forces is meant forces that are exerted in the plane of the printhead structure or at a small angle out of the plane of the printhead structure and pointing away from the center of said printhead structure. When the plane of the printhead structure is taken as 180°, the small angle out of the plane of the printhead structure means that the forces are applied under an angle of at least 135°.

The forces can be exerted by any means, e.g. the printhead structure can be stretched by fitting it between two frames fitting snugly one over another for holding the printhead structure taut as e.g. is done in an embroidery frame.

The lateral forces can also be applied by the resilience of the material from which the printhead structure is made. In that case the printhead structure is stretched over the bars forming the frame and firmly attached (e.g. glued) to the bars.

The lateral forces are preferably applied by external resilient means, e.g. rubber bands, coil springs, etc.

When the frame, whereover the printhead structure is stretched, has its simplest form, i.e. it is only one bar, the printing apertures (107) are arranged in the close vicinity of said bar, while the row(s) of said apertures are parallel to said bar.

In case of a one bar frame, one or more auxiliary bars, together with a main bar, can be present. In this case only said main bar has to fulfil the flatness requirement of 50 $\mu$m, preferably 25 $\mu$m. The printing apertures (107) are arranged in the close vicinity of said main bar, while the row(s) of said apertures are parallel to said main bar (see e.g. FIG. 2). For the highest flatness, it is preferred to locate the printing apertures (107) as close as possible to said bar. The practical distance of the said apertures from said bar is dictated by the physical shape of the toner delivery means (101).

When said frame consists of two parallel bars, the printhead structure can be either square or rectangular, having one dimension longer than the distance between the two bars forming the frame and another dimension smaller than the length of the bars forming the frame (in case of a square printhead, the sides of the square must both be larger than the distance between the bars and smaller then the length of said bars).

Figure 2:
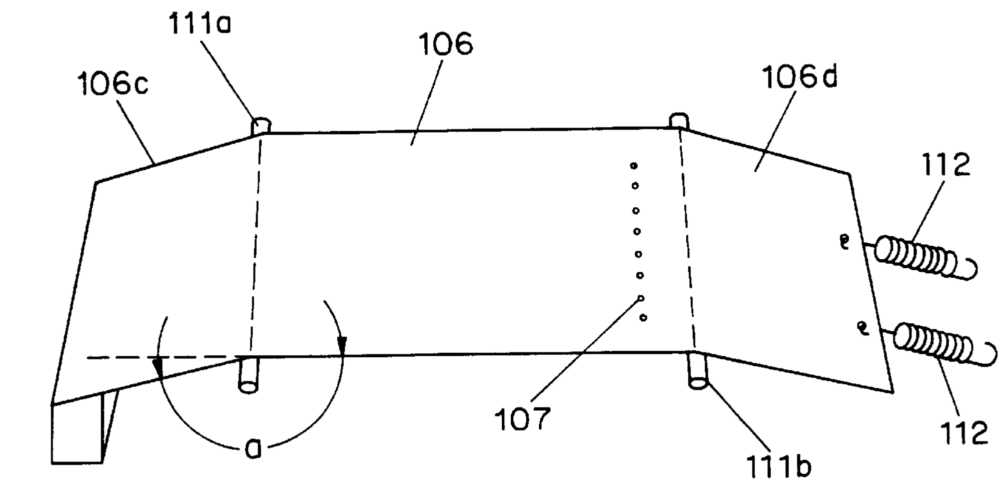
FIG. 2 is a schematic illustration of a printhead structure stretched over a two bar frame.
Figure 3:
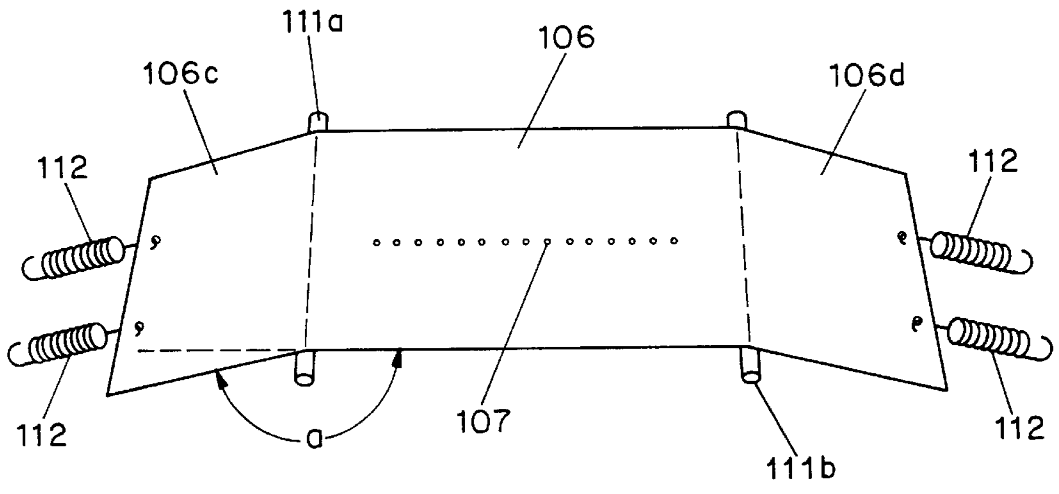
FIG. 3 is a schematic illustration of another embodiment of a printhead structure stretched over a two bar frame.

In FIG. 2 a possible embodiment of a printhead structure stretched over a two bar frame is shown. Lateral forces are exerted on the printhead structure 106, extending over the bars 111*a* and 111*b*, by fixing one side (106*c*) of the printhead structure 106, extending over bar 111*a* in a non-resilient way (or using only the own resilience of the printhead structure 106) and fixing the other side (106*d*) of the printhead structure 106, extending over bar 111*b*, in a resilient way by coil springs 112. The lateral forces are, at both sides, exerted under an angle $\alpha$, being larger than 135°. For sake of clarity in the FIGS. 2 to 6 only one angle $\alpha$ is shown. Most preferably both sides are fixed in a resilient way, as shown in FIG. 3. Lateral forces are exerted on the printhead structure 106, by fixing both sides (106*c* and 106*d*), extending over the bars 111*a* and 111*b*, in a resilient way by coil springs 112. The lateral forces are, on both sides, exerted under an angle $\alpha$, being larger than 135°.

In case of a two bar frame the printhead structure is stretched over said bars by lateral forces exerted at an angle greater than 135°, preferably an angle greater than 155° and most preferably over angle greater than 165°. (180° being the plane of the printhead structure).

The location of the printing apertures (107) in the printhead structure can, in case of a two bar frame, be chosen in the middle between said two bars, but preferably the printing apertures are located in the vicinity of one of the bars, preferably at a distance from one of said bars equal to or lower than a fourth of the distance between the two bars.

In a two bar frame, only one bar has to fulfil the flatness requirement of 50 $\mu$m, preferably 25 $\mu$m, in this case the embodiment reverts to a one bar frame, wherein one auxiliary bar is present. In this case, the printing apertures (107) are arranged in the close vicinity of said main bar, while the row(s) of said apertures are parallel to said main bar (see e.g. FIG. 2). For the highest flatness, it is preferred to locate the printing apertures (107) as close as possible to said bar. The practical distance of the said apertures from said bar is dictated by the physical shape of the toner delivery means (101).

It is however preferred that, in a two bar frame, both bars fulfil the flatness requirement of 50 $\mu$m, preferably 25 $\mu$m.

In case of a four bar frame, the printhead structure is preferably rectangular or square, and is in every direction longer than the distance between two opposite bars. The corners of the rectangular or square printhead structure, extending beyond the bars forming the frame, are preferably cut away. The cut-aways preferably have a form that avoids the concentration of stress, induced by stretching the printhead structure (106), in a single point. The exact form of the cut-away for relieving stress concentration can be calculated from the properties of the materials wherefrom the printhead structure is made and from the lateral forces exerted on said printhead structure. This means that the cut-away will be a polygon and in the limit a fluent curve, with a form adapted to the properties of the printhead strucure and the forces exerted on it.

In the most preferred embodiment, the corners of the rectangular or square printhead structure are cut away so that the width of the portions extending over each of said four bars, is lower than the length of the individual bar whereover every individual extending portion is stretched.

Figure 4:
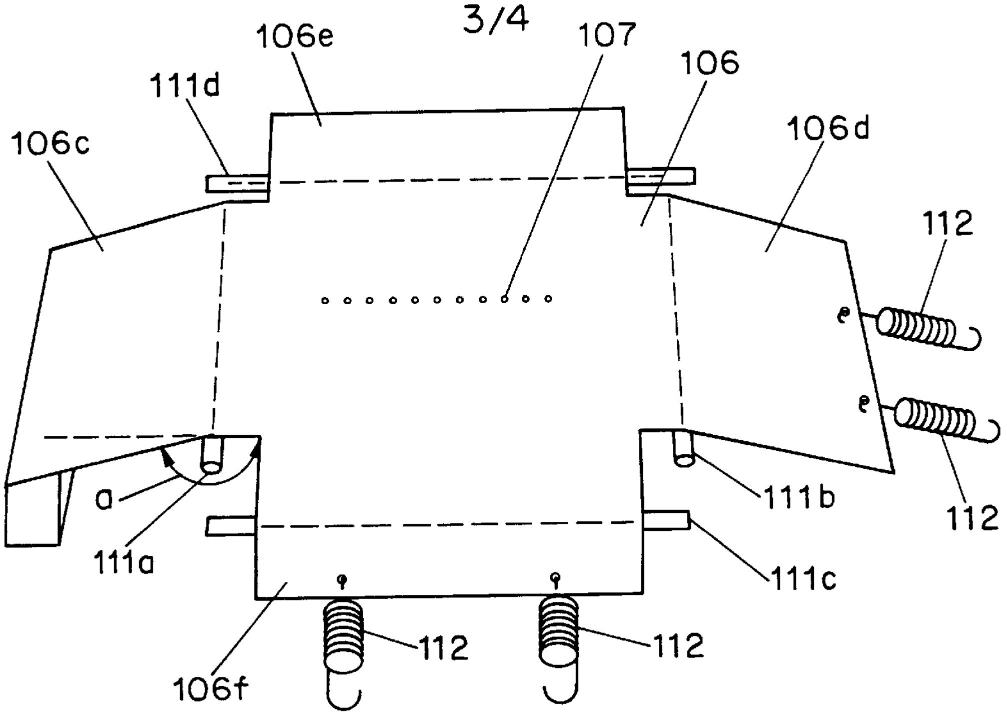
FIG. 4 is a schematic illustration of a printhead structure stretched over a four bar frame.

The printhead structure may be stretched over said four bar frame in different ways. In FIG. 4 a possible embodiment is shown. Two adjacent sides (106*c* and 106*e*) of the printhead structure (106) extending over bars 111*a* and 111*d*, are fixed in a non resilient way (or by using only the resilience of the material of which the printhead structure (106) is made), the two other sides (106*d* and 106*f*) of the printhead structure (106) are fixed by resilient means, coil spring 112. The printing apertures 107 are preferably located in the middle of the printhead structure. On the four sides the lateral forces are exerted under an angle $\alpha$ being larger than 155°.

Figure 5:
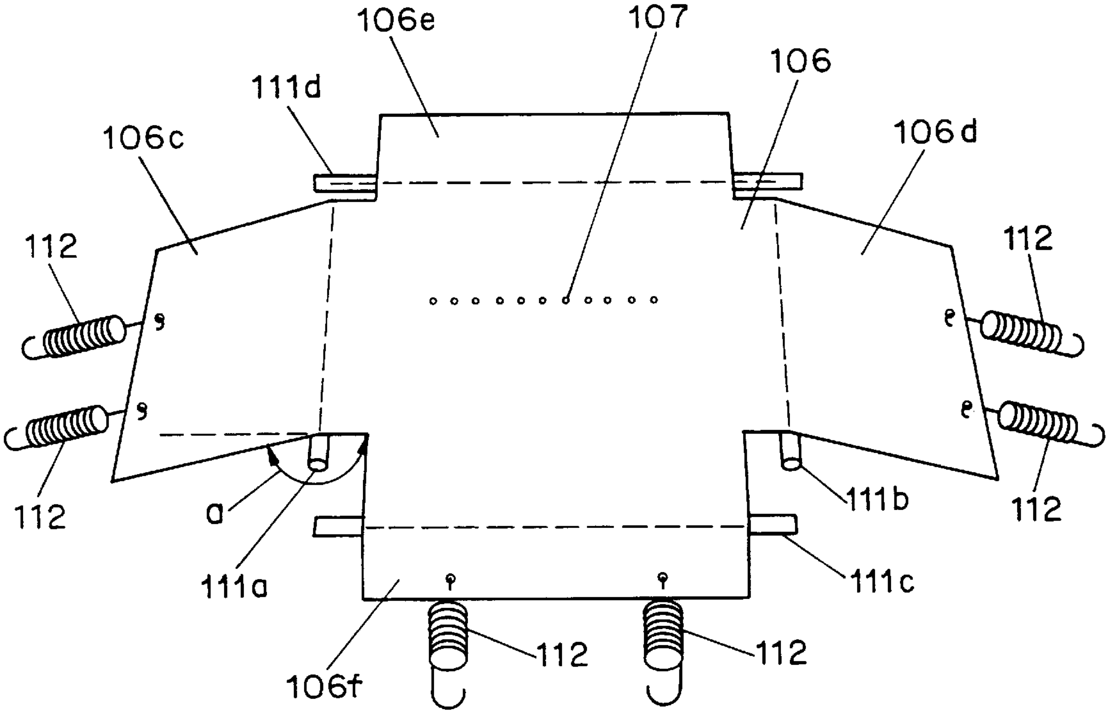
FIG. 5 is a schematic illustration of another embodiment of a printhead structure stretched over a four bar frame.

Another possible embodiment using a four bar frame is shown in FIG. 5. One side (106*e*) of the printhead structure (106), extending over bar 111*d*, is fixed in a non resilient way (or using the own resilience of the material of which the printhead structure (106) is made), and the three other sides (106*c*, 106*d*, 106*f*) of the printhead structure (106), extending over bars 111*a*, 11*b*, 111*c*, are fixed by resilient means, the coil springs 112. The printing apertures 107 are preferably located in the middle of the printhead structure. On the four sides the lateral forces are exerted under an angle $\alpha$ being larger than 155°.

Figure 6:
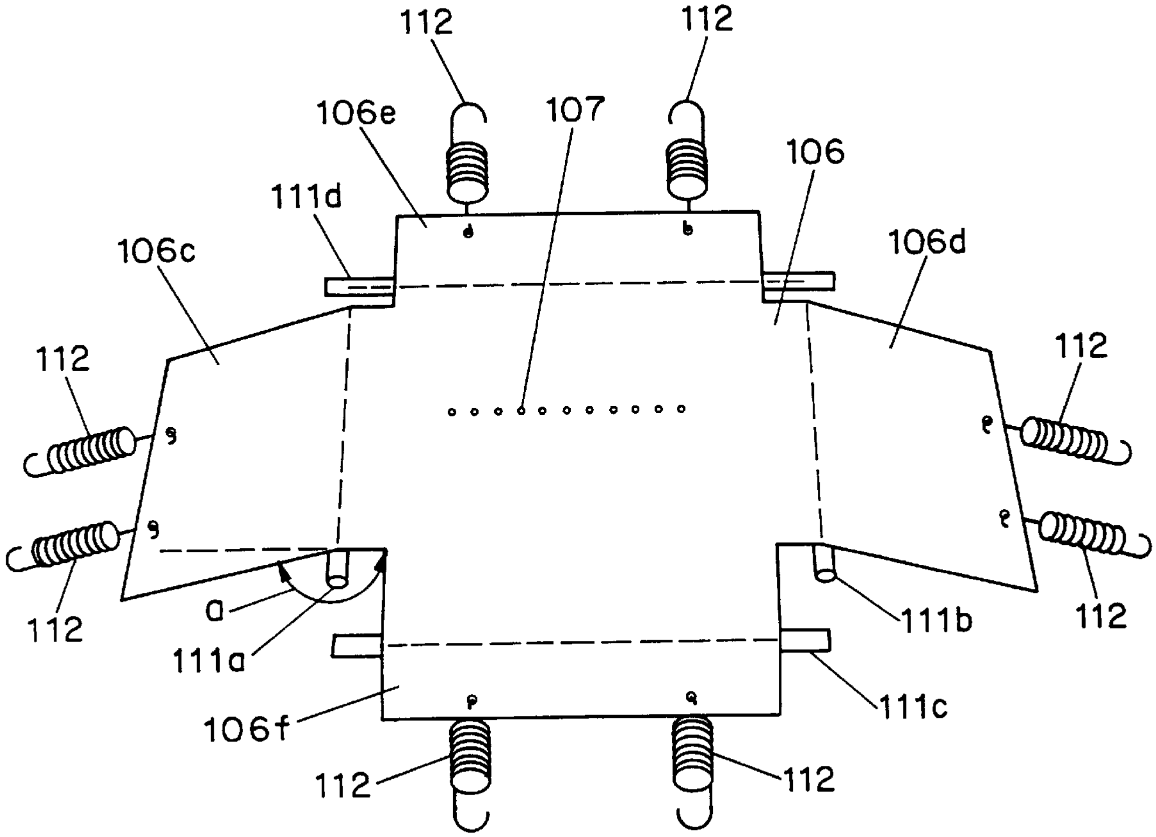
FIG. 6 is a schematic illustration of still another embodiment of a printhead structure stretched over a four bar frame.

In FIG. 6 the most preferred embodiment for stretching a printhead structure over a four bar frame is shown. The four sides (106*c*, 106*d*, 106*e* 106*f*) of the printhead structure (106), extending over bars 111*a*, 111*b*, 111*c* and 111*d*, are fixed by resilient means, the coil springs 112. The printing apertures 107 are preferably located in the middle of the printhead structure. On the four sides the lateral forces are exerted under an angle $\alpha$ being larger than 155°.

In the case of a four bar frame, the printhead structure is stretched over said bars by lateral forces exerted at an angle greater than 155° and preferably over angle greater than 165°. (180° being the plane of the printhead structure).

Also in a four bar frame, it is only needed that one of the bars fulfils the flatness requirement of 50 $\mu$m, preferably 25 $\mu$m, in this case the embodiment reverts to a one bar frame, wherein three auxiliary bars are present and a flat main bar. In this case, the printing apertures (107) are arranged in the close vicinity of said main bar, while the row(s) of said apertures are parallel to said main bar. For the highest flatness, it is preferred to locate the printing apertures (107) as close as possible to said bar. The practical distance of the said apertures from said bar is dictated by the physical shape of the toner delivery means (101).

It is however preferred in a four frame bar that at least the two opposite bars fulfil the flatness requirement of 50 $\mu$m, preferably 25 $\mu$m. In the most preferred embodiment, all four bars fulfil said flatness requirement.

The use of resilient means to exert lateral forces on the printhead structure offers the advantage that the flatness is kind of self rectifying, independently of the variations of temperature or of aging of the materials, the flatness of the printhead structure is guaranteed.

Said resilient means can be attached to holes in the sides of the printhead structure. The vicinity of said holes is preferably reinforced. This reinforment can be effected by any means known in the art, E.g. by having ticker plastic along the edges, by having a thicker metal layer along the edge, by having metal ring aroud the holes, etc. The resilient means can be attached to the printhead structure by clamping means not necessitating the punching of holes in the printhead structure.

The magnitude of the forces applied to the printhead structure is determined by the material in the printhead structure having the lowest limit of elasticity, since otherwise permanent deformations of the printhead structure are observed. The forces, applied to said printhead structure, have to be such that the stress exerted by the streching of said printhead structure, does not bring about a deformation (elongation) exceeding 5%.

When the lateral forces are applied to the printhead in two directions perpendicular to each other, the stress induced in the printhead structure in said two perpendicular directions may be equal. It is preferred that the stress, induced along the line (rows) of the printing printing apertures (107) is larger than the stresses induced perpendicular to the rows (i.e. parallel to the columns) of said printing apertures (107). The anisotropy of the stresses induced in the printhead structure is preferably in the range 6:1 to 1:6, most preferably in the range 3:1 to 1:3, i.e. the lateral forces are preferably exerted anisotropically with an anisotropy factor between 6:1 to 1:6, most preferably the anisotropy factor lies between 3:1 to 1:3.

A printhead structure, held flat by means according to the present invention, can be used in any DEP device.

It can e.g. be used in devices using toner conveyer means to present a monolayer of toner in the vicinity of the printhead structure, as disclosed in e.g. U.S. Pat. No. 4,743,926, U.S. Pat. No. 4,780,733, DE-OS 3411948, EP-A 266 960, etc.

It can be used in devices where the toner is presented to the printhead from a magnetic brush as disclosed in e.g. European Application 94201026.5 filed on Apr. 14, 1994, U.S. Pat. No. 5,327,169. It can be used in devices where the uniform toner cloud in the vicinity of the printhead structure is provided by oscillating fields (e.g. an AC field as disclosed in e.g. European Application 94201026.5 filed on Apr. 14, 1994) or by mechanical means as is disclosed in e.g. U.S. Pat. No. 5,202,704.

The printing apertures (107) in the printhead structure, held flat by means according to the present invention, can be of any form, the holes can be formed as disclosed in e.g. U.S. Pat. No. 3,689,935, GB-A 2,108,432 etc. The printing apertures (107) in the printhead structure, held flat by means according to the present invention, can be present in one row or in multiple rows, they can be staggered or non staggered, etc.

A printhead structure, held flat by means according to the present invention, can be used in devices comprising a full back electrode (105) or a segmented back electrode.

Said printhead structure can be used with any developer, monocomponent or multicomponent, with coloured or black or colourless toners, developers comprising fluidity improvers as e.g. hydrophobic silica particles, etc.

We claim:

1. A device for direct electrostatic printing (DEP) on a receiving substrate, comprising a back electrode, a thin printhead structure made from an insulating material and comprising a control electrode in combination with printing apertures, a frame, a means for tightly stretching said printhead structure over said frame by lateral forces applied to said printhead structure such that an area surrounding said printing apertures on a surface of said printhead structure opposing and closest to said receiving substrate has an overall flatness equal to or better than 50 $\mu$m, and a means for delivering toner presenting a cloud of toner particles to said printing apertures.

2. A device according to claim 1, wherein said overall flatness of said area surrounding said printing apertures is equal to or better than 25 $\mu$m.

3. A device according to claim 1, wherein said lateral forces are applied by resilient means.

4. A device according to claim 3 wherein said resilient means are coil springs.

5. A device according to claim 1, wherein said frame comprises two bars and said printhead structure has four sides.

6. A device according to claim 5, wherein at least one of said bars has an overall flatness better than 50 μm.

7. A device according to claim 5, wherein a first side of said four sides of said printhead structure is fixed in a non-resilient way and a second side of said four sides, opposite to said first side, is fixed by resilient means.

8. A device according to claim 5, wherein a first side of said four sides of said printhead structure and a second side of said four sides, opposite to said first side, are fixed by resilient means.

9. A device according to claim 5, wherein said lateral forces are applied to said printhead structure under an angle greater than 135°.

10. A device according to claim 1, wherein said frame comprises four bars and said printhead structure has four sides.

11. A device according to claim 10, wherein at least one of said bars has an overall flatness better than 50 μm.

12. A device according to claim 10, wherein a first side of said four sides of said printhead structure is fixed in a non-resilient way and three of said four sides are fixed by resilient means.

13. A device according to claim 10, wherein a first and a second of said four sides of said printhead structure, adjacent to each other, are fixed in a non-resilient way and a third and fourth of said four sides are fixed by resilient means.

14. A device according to claim 10, wherein the four sides of said printhead structure are fixed by resilient means.

15. A device according to claim 10, wherein said lateral forces are applied to said printhead structure under an angle greater than 155°.

16. A device according to claim 10, wherein said lateral forces have an anisotropy factor between 6:1 to 1:6.

17. A device according to claim 10, wherein said four sides of said printhead structure form four corners which are cut away.

* * * * *

UNITED STATES PATENT AND TRADEMARK OFFICE
CERTIFICATE OF CORRECTION

PATENT NO. : 5,850,244

DATED : December 15, 1998

INVENTOR(S) : Leonard et al.

It is certified that error appears in the above-identified patent and that said Letters Patent is hereby corrected as shown below:

Column 1, line 5, "1. Field of the Invention" should read --FIELD OF THE INVENTION--;

Column 1, line 12, "2. Background of the Invention." should read --BACKGROUND OF THE INVENTION--;

Column 4, line 15, "$\leqq$ thickness $\leqq$" should read -- $\leq$ thickness $\leq$ --;

Column 5, line 50, "fulfil" should read --fulfill--;

Column 7, line 26, "preferably over angle greater" should read --preferably over an angle greater--;

Column 7, line 51, "E.g." should read -- e.g. --;

Column 7, line 51, "having ticker plastic" should read --having thicker plastic--.

Signed and Sealed this

Twenty-eighth Day of December, 1999

*Attest:*

Q. TODD DICKINSON

*Attesting Officer* *Acting Commissioner of Patents and Trademarks*